United States Patent
Wilson

(10) Patent No.: US 8,527,608 B2
(45) Date of Patent: Sep. 3, 2013

(54) METHOD, APPARATUS AND SYSTEM FOR REDUCING DOWNLOAD OF REDUNDANT ATTACHMENTS

(75) Inventor: Nicholas Bryson Wilson, Kanata, CA (US)

(73) Assignee: Blackberry Limited, Waterloo, ON (CA)

(*) Notice: Subject to any disclaimer, the term of this patent is extended or adjusted under 35 U.S.C. 154(b) by 698 days.

(21) Appl. No.: 12/412,676

(22) Filed: Mar. 27, 2009

(65) Prior Publication Data

US 2010/0250705 A1    Sep. 30, 2010

(51) Int. Cl.
*G06F 15/16* (2006.01)
*G06F 12/00* (2006.01)

(52) U.S. Cl.
USPC .......................................... 709/219; 709/250

(58) Field of Classification Search
USPC ......... 709/204–207, 203, 217–219, 223–229, 709/250
See application file for complete search history.

(56) References Cited

U.S. PATENT DOCUMENTS

| | | | |
|---|---|---|---|
| 6,505,236 B1 | 1/2003 | Pollack | |
| 7,035,902 B1* | 4/2006 | Bates et al. | 709/206 |
| 7,409,425 B2 | 8/2008 | Naick et al. | |
| 7,444,382 B2 | 10/2008 | Malik | |
| 7,496,604 B2* | 2/2009 | Sutton et al. | 1/1 |
| 2001/0054073 A1* | 12/2001 | Ruppert et al. | 709/206 |
| 2003/0105716 A1* | 6/2003 | Sutton et al. | 705/50 |
| 2003/0115273 A1 | 6/2003 | Delia | |
| 2005/0283461 A1* | 12/2005 | Sell et al. | 707/1 |
| 2006/0095527 A1 | 5/2006 | Malik | |
| 2008/0077676 A1* | 3/2008 | Nagarajan et al. | 709/206 |
| 2009/0203359 A1* | 8/2009 | Makhoul et al. | 455/412.2 |
| 2009/0282086 A1* | 11/2009 | Heimes | 707/200 |

FOREIGN PATENT DOCUMENTS

| | | | |
|---|---|---|---|
| EP | 1339195 A | | 8/2003 |
| EP | 1667388 A | | 6/2006 |
| WO | 2006053950 A | | 5/2006 |
| WO | 2008010212 A2 | | 1/2008 |

OTHER PUBLICATIONS

European Patent Application No. 09 15 6434 Search Report dated Sep. 1, 2009.
European Patent Application No. 09 156 434.4 Examiner's Report dated Oct. 5, 2010.

* cited by examiner

*Primary Examiner* — Zarni Maung
(74) *Attorney, Agent, or Firm* — Perry + Currier

(57) ABSTRACT

A method, apparatus and system for reducing download of redundant attachments to a communication device from a server is provided. An identifier of an attachment to a message, for transmission from the server to the communication device, is compared with identifiers of attachments already stored in a memory at the communication device. The communication device is caused to retrieve a copy of the attachment from the memory if a match is found between the identifier and the identifiers of attachments already stored in the memory.

19 Claims, 6 Drawing Sheets

METHOD, APPARATUS AND SYSTEM FOR REDUCING DOWNLOAD OF REDUNDANT ATTACHMENTS

FIELD

The specification relates generally to communication devices, and specifically to a method, apparatus and system for reducing download of redundant attachments to a communication device from a server.

BACKGROUND

In mobile communication devices, attachments to messages, such as e-mail, are not generally downloaded until an attempt is made to open an attachment. In some situations, a plurality of different messages may be sent to a communication device, with each of the plurality of messages having the same attachment, for example if multiple copies of the same e-mail are forwarded to the communication device and/or if different e-mails having the same attachment are transmitted to the communication device in attempt to gain the attention of a user of the communication device (e.g. in a reminder e-mail). If the same attachment associated with each separate e-mail is opened, then the attachment will be redundantly downloaded to the communication device, which is a waste of bandwidth and also increases costs to the user, especially as the attachment is generally saved in a memory of the communication device the first time it is opened.

BRIEF DESCRIPTIONS OF THE DRAWINGS

Embodiments are described with reference to the following figures, in which.

DETAILED DESCRIPTION OF THE EMBODIMENTS

Figure 1:
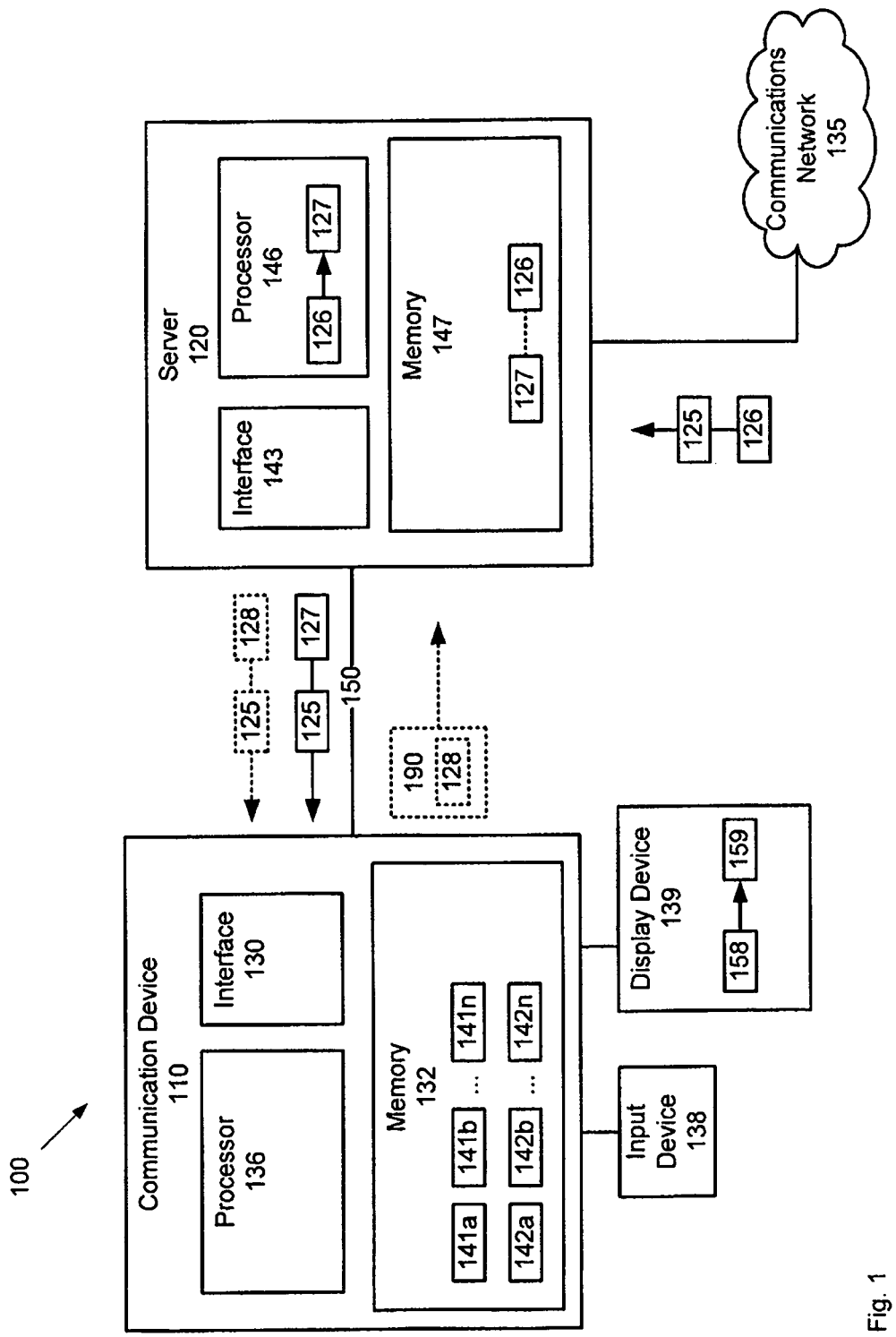
FIG. 1 depicts a system for reducing download of redundant attachments to a communication device from a server, according to non-limiting embodiments.

A first aspect of the specification provides a method for reducing download of redundant attachments to a communication device from a server. The method comprises comparing an identifier of an attachment to a message, for transmission from the server to the communication device, with identifiers of attachments already stored in a memory at the communication device. The method further comprises causing the communication device to retrieve a copy of the attachment from the memory if a match is found between the identifier and the identifiers of attachments already stored in the memory.

If no match is found between the identifier and the identifiers of attachments already stored in the memory, the attachment can be caused to be transmitted to the communication device from the server.

The method can further comprise maintaining a list of the identifiers of attachments already stored in a memory at the communication device at, at least one of the communication device and the server.

The method can be implemented in the communication device, and can further comprise receiving the identifier at the communication device, the identifier received in lieu of the attachment. The method can further comprise requesting the identifier from the server. Causing the communication device to retrieve a copy of the attachment from the memory can occur via a processing unit of the communication device. The method can further comprise requesting the attachment from the server if no match is found between the identifier and the identifiers of attachments already stored in the memory.

The method can be implemented in the server, and causing the communication device to retrieve the copy of the attachment can comprise transmitting the identifier and the message to the communication device to trigger retrieval of the copy of the attachment from the memory based on the identifier.

Each of the identifier and the identifiers of attachments already stored in the memory at the communication device can comprise a hash of each respective attachment and the attachments already stored in the memory.

The method can further comprise generating the identifier.

A second aspect of the specification provides a server for reducing download of redundant attachments to a communication device. The server comprises a communication interface for communicating with the communication device. The server further comprises a processing unit in communication with the communication interface. The processing unit is enabled to compare an identifier of an attachment to a message for transmission from the server to the communication device with identifiers of attachments already stored in a memory at the communication device. The processing unit is further enabled to cause the communication device to retrieve a copy of the attachment from the memory if a match is found between the identifier and the identifiers of attachments already stored in the memory.

If no match is found between the identifier and the identifiers of attachments already stored in the memory, the attachment can be transmitted to the communication device from the server.

The server can further comprise a server memory for maintaining a list of the identifiers of attachments already transmitted and likely stored in the memory at the communication device.

The processing unit can be further enabled to cause the communication device to retrieve the copy of the attachment by transmitting the identifier and the message to the communication device to trigger retrieval of the copy of the attachment from the memory based on the identifier.

Each of the identifier and the identifiers of attachments already stored in a memory at the communication device can comprise a hash of each respective attachment and the attachments already stored in the memory.

The processing unit can be further enabled to generate the identifier.

A third aspect of the specification provides a communication device for reducing download of redundant attachments to the communication device from a server. The communication device comprises a communication interface for communicating with the server. The communication device further comprises a memory for storing attachments and identifiers of the attachments. The communication device further comprises a processing unit in communication with the communication interface and the memory. The processing unit is enabled to receive, from the server, via the communication interface, an identifier of an attachment to a message for transmission from the server to the communication device. The processing unit is further enabled to compare the identifier with the identifiers of the attachments stored in the memory. The processing unit is further enabled to retrieve a copy of the attachment from the memory if a match is found between the identifier and the identifiers of attachments stored in the memory.

The processing unit can be further enabled to maintain a list of the identifiers of attachments stored in the memory.

The processing unit can be further enabled to receive, from the server, the identifier in lieu of the attachment.

The processing unit can be further enabled to request the identifier from the server.

If no match is found between the identifier and the identifiers of attachments stored in the memory, the processing unit can be enabled to retrieve the attachment from the server.

Each of the identifier and the identifiers of attachments stored in the memory can comprise a hash of each attachment and the attachments stored in the memory.

A fourth aspect of the specification provides for a system for reducing download of redundant attachments. The system comprises a communication device and a server, in communication via a communication network. The server is enabled to: generate an identifier of an attachment to a message for transmission from the server to the communication device; and transmit the identifier to the communication device with the message, in lieu of the attachment. The communication device is enabled to: receive the identifier with the message; compare the identifier with identifiers of attachments already stored in a memory at the communication device; retrieve a copy of the attachment from the memory if a match is found between the identifier and the identifiers of attachments already stored in the memory; and request the attachment from the server if a match is not found between the identifier and the identifiers of attachments already stored in the memory.

A fifth aspect of the specification provides a computer readable storage medium storing programming instructions executable on a processor of a computing device, the programming instructions causing the computing device to: compare an identifier of an attachment to a message, for transmission from a server to a communication device, with identifiers of attachments already stored in a memory at the communication device; and cause the communication device to retrieve a copy of the attachment from the memory if a match is found between the identifier and the identifiers of attachments already stored in the memory.

FIG. 1 depicts a system 100 for reducing download of redundant attachments to a communication device 110 from a server 120, according to non-limiting embodiments. Communication device 110 and server 120 are in communication via a link 150. The link 150 can be wireless or wired as desired; link 150 can further comprise any suitable communication network. In general server 120 is enabled to receive a message 125 having an attachment 126 from a communication network 135, message 125 and attachment 126 intended to be transmitted to communication device 110. At least one of communication device 110 and server 120 is enabled to determine an identifier 127 of attachment 126, as described below, though in depicted embodiments server 120 determines identifier 127. Furthermore, at least one of communication device 110 and server 120 is enabled to compare identifier 127 with identifiers 141*a*, 141*b*, . . . 141*n* of respective attachments 142*a*, 142*b*, . . . 142*n* already stored at communication device 110.

Communication device 110 generally comprises any suitable communication/computing device, and generally a mobile communication device, including but not limited to a laptop computer, a PDA, a cellphone, and the like, and/or a combination.

Communication device 110 comprises a communication interface 130 enabled to communicate with server 120, interface 130 being generally compatible with link 150. That is, if link 150 comprises a wireless link, interface 130 is enabled to communicate wirelessly, using any suitable protocol; and/or if link 150 comprises a wired link, then interface 130 is enabled to communicate via a wired link, using any suitable wired protocol.

Communication device 110 further comprises a memory 132 for storing attachments 142*a*, 142*b* . . . 142*n* (generically an attachment 142, and collectively attachments 142). Memory 132 further stores identifiers 141*a*, 141*b* . . . 141*n* (generically an identifier 141, and collectively identifiers 141) of attachments 142, in a one-to-one relationship. Furthermore, it is understood that each identifier 141 identifies a respective attachment 142, such that an attachment 142 can be located and retrieved from memory 132 given a respective identifier 141. In some embodiments, identifiers 141 can be stored in a list in memory 132. In general, each attachment 142 is understood to have been associated with a previously received message, similar to message 125, and furthermore downloaded and saved to communication device 110 when attachment 142 was processed and/or accessed and/or opened, for example within a suitable application for viewing attachment 142. Each identifier 141 can be generated at communication device 110 when each attachment 142 is received from server 120 and/or each identifier 141 can be generated at server 120 and transmitted to communication device 110 with an associated message.

Memory 132 can comprise any suitable memory device, including but not limited to random access memory (RAM), removable memory, memory cards, hard disks, and the like.

Communication device 110 further comprises a processor 136 in communication with interface 130 and memory 132, for example via a suitable computer bus (not depicted). Processor 136 is generally enabled to process data transmitted between communication device 110 and server 120, including but not limited to message 125, as described below.

Communication device 110 can also be in communication with any suitable input device 138, generally enabled to receive input data. Input device 138 can comprise any suitable combination of suitable input devices, including but not limited to a keyboard, a pointing device, a mouse, a track wheel, a touchpad, a touch screen and the like.

Communication device 110 can also be in communication with any suitable display device 139. The display device 139 can include, but is not limited to, a flat panel display (e.g. a liquid crystal display (LCD), plasma, and the like), a cathode ray tube (CRT), a computer monitor, and the like. Display device 139 comprises circuitry 158 for generating a representation 159 of message 125 and/or attachment 126 and/or attachments 142. Display device 139 can include any suitable combination of CRT and/or flat panel displays (e.g. LCD, plasma and the like), and circuitry 158 can include any suitable combination of circuitry for controlling a CRT and/or flat panel displays etc., including but not limited to display buffers, transistors, electron beam controllers, LCD cells, plasmas cells, phosphors etc. In particular, display device 139 and circuitry 158 can be controlled by processor unit 136 to generate representation 159.

In some embodiments, communication device 110 can comprise input device 138 and display device 139.

Server 120 generally comprises a computing device for managing messages such as message 125, and attachments to messages, such as attachment 126. Server 120 can be further enabled to generate identifiers 141 and identifier 127. Server 120 comprises an interface 143, which can be similar to interface 130, interface 143 is generally compatible with link 150. Server 120 further comprises a memory 147, which can be similar to memory 132, as described above. In some embodiments, memory 147 can store identifiers of attachments 142, as described below. Server 120 further comprises a processor 146 for managing messages and attachments, such as message 125 and attachment 126, respectively. In some embodiments processor 146 is enabled to generate identifiers 141 and identifier 127.

Figure 2:
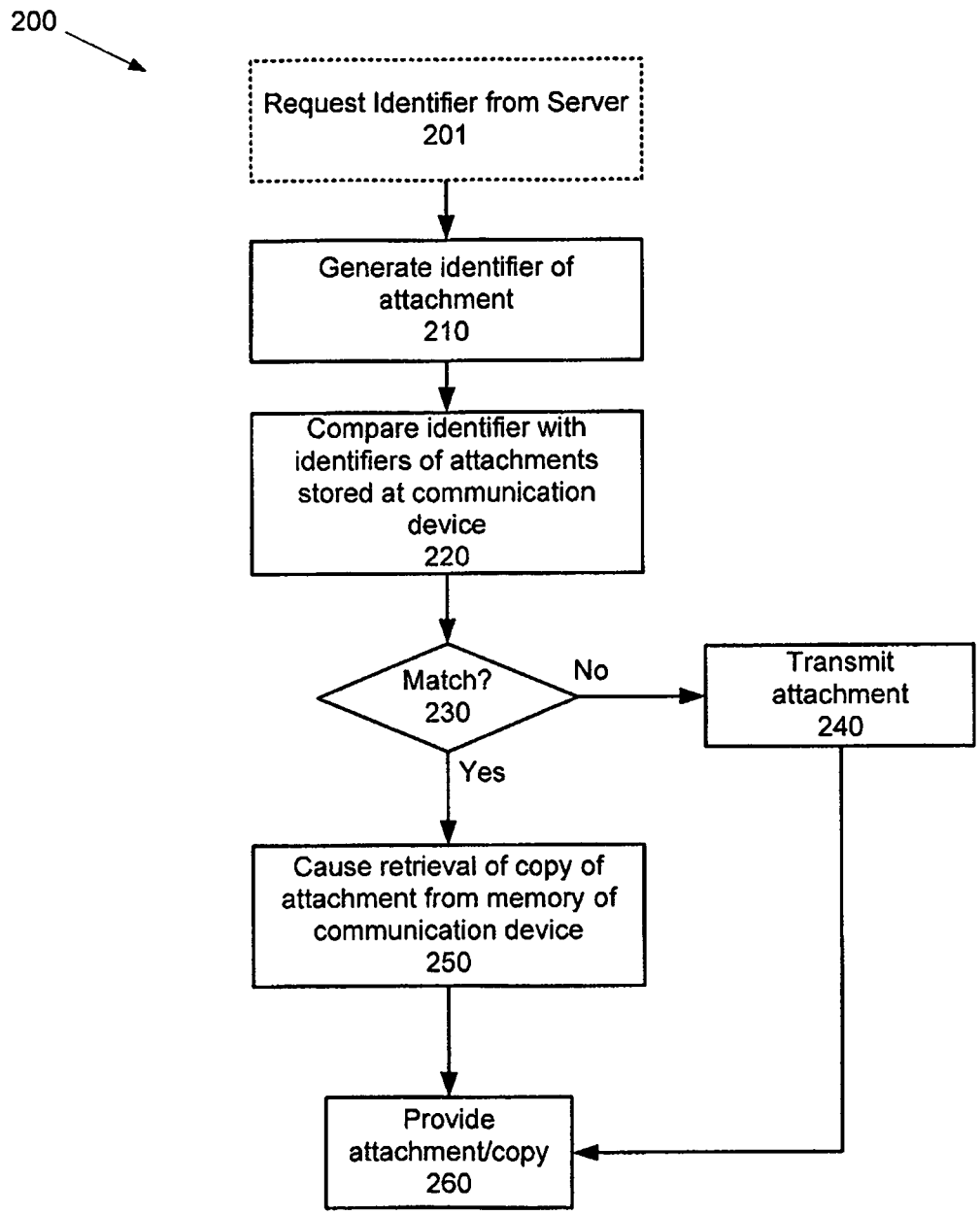
FIG. 2 depicts a method for reducing download of redundant attachments to a communication device from a server, according to non-limiting embodiments.

Attention is now directed to FIG. 2 which depicts a method 200 for reducing download of redundant attachments to a communication device from a server. In order to assist in the explanation of the method 200, it will be assumed that the method 200 is performed using the system 100. Furthermore, the following discussion of the method 200 will lead to a further understanding of the system 100 and its various components. However, it is to be understood that the system 100 and/or the method 200 can be varied, and need not work exactly as discussed herein in conjunction with each other, and that such variations are within the scope of present embodiments.

In various embodiments, method 200 can be implemented in at least one of communication device 110 and server 120:

Embodiment 1

Server 120 transmits identifier 127 (including but not limited to a hash value representation of any attached documents, such as attachment 126, in message 125) to communication device 110. Prior to requesting any documents for download, communication device 110 searches its local data store, such as memory 132, for a document (e.g. attachments 142) which corresponds to the received identifier 127, e.g. by comparing identifier 127 to identifiers 141. If identifier 127 is not found within identifiers 141, then document/attachment 126 is requested from server 120 for download. If identifier 127 is found within identifiers 141, then communication device 110 retrieves attachment 142, which corresponds to attachment 126, from memory 132, rather than download attachment 126 from server 120, thus saving bandwidth.

Embodiment 2

Communication device 110 requests, from server 120, identifier 127 of a document/attachment 126 it is about to download from server 120. Upon receipt of identifier 127, communication device 110 searches its local data store, such as memory 132, for a document (e.g. one of attachments 142) which corresponds to the received identifier 127, e.g. by comparing identifier 127 to identifiers 141. If identifier 127 is not found within identifiers 141, then document/attachment 126 is requested from server 120 for download. If identifier 127 is found within identifiers 141, then communication device 110 retrieves attachment 142, which corresponds to attachment 126, from memory 132, rather than download attachment 126 from server 120, thus saving bandwidth.

Embodiment 3

Figure 5:
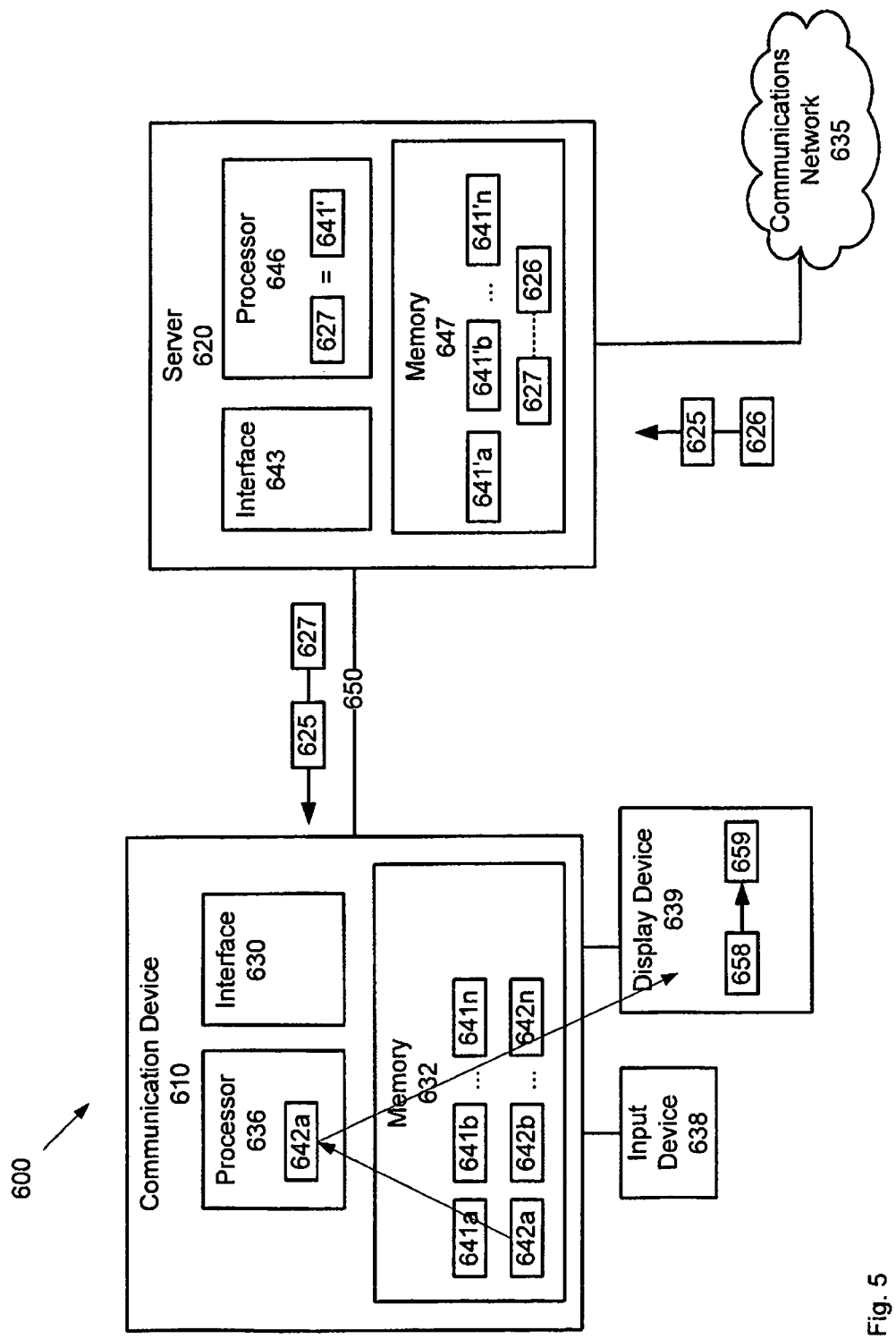
FIGS. 5 and 6 depict a system for reducing download of redundant attachments to a communication device from a server, according to non-limiting embodiments.
Figure 6:
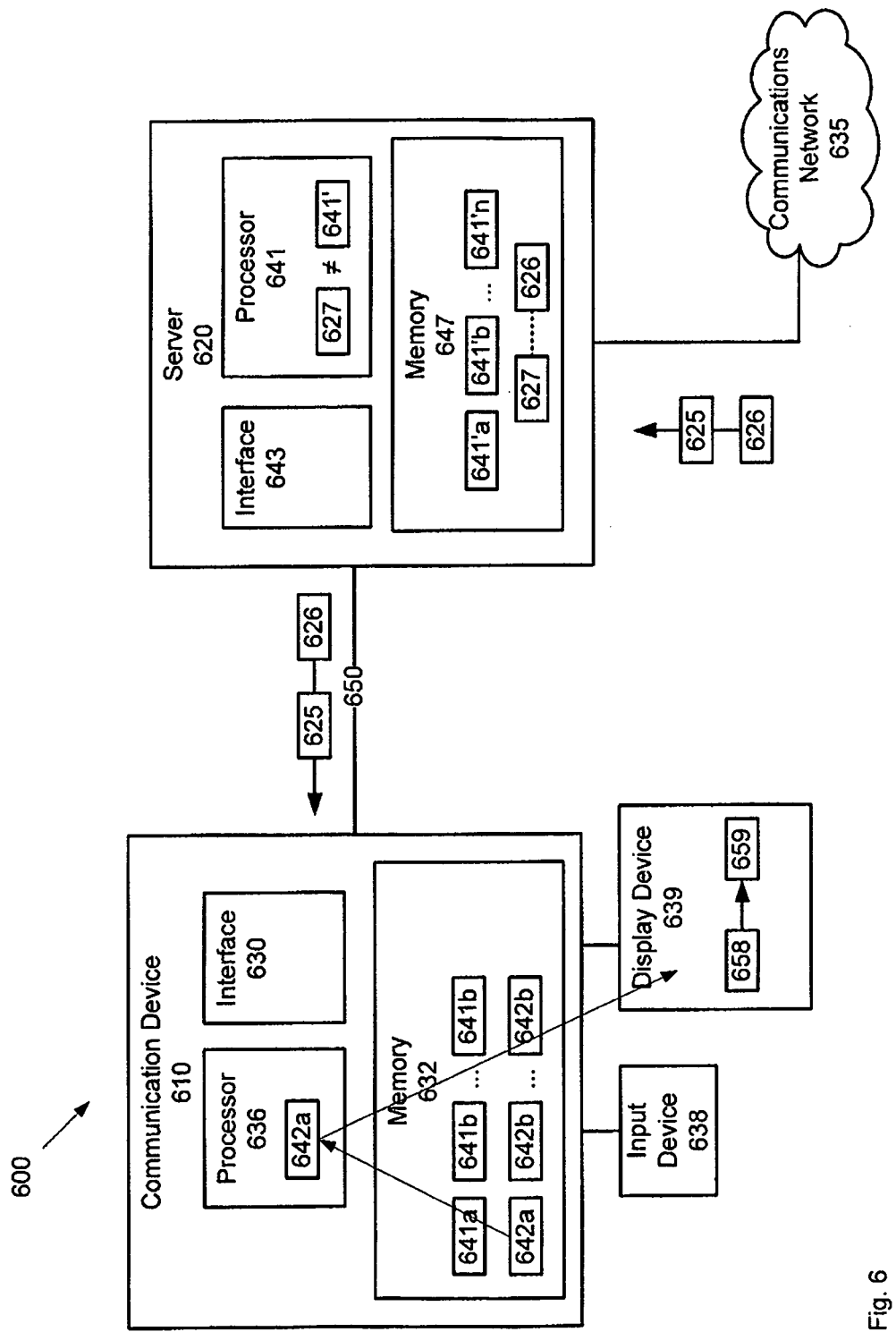

With reference to FIGS. 5 and 6, described below, a server 620 (similar to server 120) can monitor which documents/attachments 642 have already been downloaded by communication device 610 (similar to communication device 110), for example, by storing identifiers 641 of documents/attachments 642 which have already been downloaded to communication device 610. If communication device 610 has already downloaded a document/attachment 642, and another message 625 is being sent to communication device 610 with the same document/attachment 626, an identifier 627 (as in FIG. 6, identifier 627, which can include a hash of document/attachment 626) can be included in message 625. Identifier 627 is indicative to communication device 610 to search a local store, such as memory 632, for a document (e.g. attachments 642) which corresponds to identifier 627 e.g. by comparing identifier 627 to identifiers 641. If identifier 627 is not found within identifiers 641, then document/attachment 626 is requested from server 620 for download. If identifier 627 is found within identifiers 641, then communication device 610 retrieves attachment 642, which corresponds to attachment 626, from memory 632, rather than download attachment 626 from server 620, thus saving bandwidth.

Returning now to FIG. 2, in exemplary embodiments, described hereafter, method 200 is implemented in communication device 110, and embodiments 1 and 2 are described.

In some alternative embodiments, a step 201 is first implemented at communication device 110: identifier 127 is requested from server 120 via a request 190 (depicted in FIG. 1 with broken lines). In general, such a request 190 is representative of embodiment 2, described above. In these embodiments, it is understood that message 125 has been received at communication device 110 along with an indication 128 that there is an associated attachment 126 which has not yet been downloaded to communication device 110, however identifier 127 has not yet been received at communication device 110 (message 125 and indicator 128 depicted in broken line in FIG. 1). For example, in some embodiments, server 120 can assign indication 128 to attachment 126, indication 128 comprising a unique alphanumeric identifier, unique from other indicators that may have already been received at communication device 110 in association with attachments 142, regardless of the content of attachment 126 and attachments 142. In other words, indication 128 is not sufficient to determine if a copy of attachment 126 is already stored at communication device 110, but does uniquely identify attachment 126 to communication device 110 and/or server 120. Hence, at step 201, in lieu of requesting attachment 126, communication device 110 requests indicator 127, via request 190, to determine if a copy of attachment 126 is already stored in memory 132. In these embodiments, request 190 can comprise indication 128 such that server 120 can identify attachment 126 and subsequently generate identifier 127, as described hereafter.

Steps following step 201 are, in general, representative of embodiment 1, described above.

At step 210, identifier 127 is generated by processor 146 at server 120 and then transmitted to communication device 110. In embodiments where step 201 is implemented, step 210 occurs upon receiving request 190 for indicator 127 from communication device 110. In embodiments where step 201 is not implemented, step 210 is implemented upon receiving message 125 and attachment 126 from communications network 135, and indicator 127 (or indication 128, or both indicator 127 and indication 128) can be transmitted to communication device 110 in association with message 125 in lieu of attachment 126, as depicted in solid lines in FIG. 1. In some embodiments, indication 128 can be received with message 125. It is generally understood that message 125 and associated attachment 126 have been received at server 120 from communication network 135, message 125 and attachment 126 intended for transmission to communication device 110. It is further understood that attachment 126 can be stored in memory 147 in association with identifier 127.

Identifier 127 can be generated by applying any suitable hash algorithm to attachment 126, such that identifier 127 is substantially and/or computationally unique. In some embodiments, identifier 127 can be generated by applying a hash algorithm from the secure hash algorithm (SHA) family of hash algorithms, for example SHA-1, SHA-224, SHA-256, SHA-384, and SHA-512, and the like. Other suitable hash algorithms are within the scope of present embodiments. In other embodiments, identifier 127 can be generated by applying a computationally unique code generator to attachment 126, to generate an identifier which conforms to the Universally Unique Identifier (UUID) Standard. A non-limiting example of an identifier which conforms to the Universally Unique Identifier (UUID) Standard is a Globally Unique Identifier (GUID).

It is furthermore understood that identifiers 141 are generated using the same algorithm used to generate identifier 127 and identifiers 141 can either have been earlier received from server 120 at communication device 110, and/or generated by communication device 110 upon receipt of each attachment 142 using the same algorithm for generating identifier 127.

In any event, once identifier 127 is generated, in these embodiments, identifier 127 is transmitted to communication device 110, as in FIG. 1. It is understood that identifier 127 is received at communication device 110 with message 125, in lieu of attachment 126. It is further understood that message 125 is processed by processor 136 to determine identifier 127.

Figure 3:
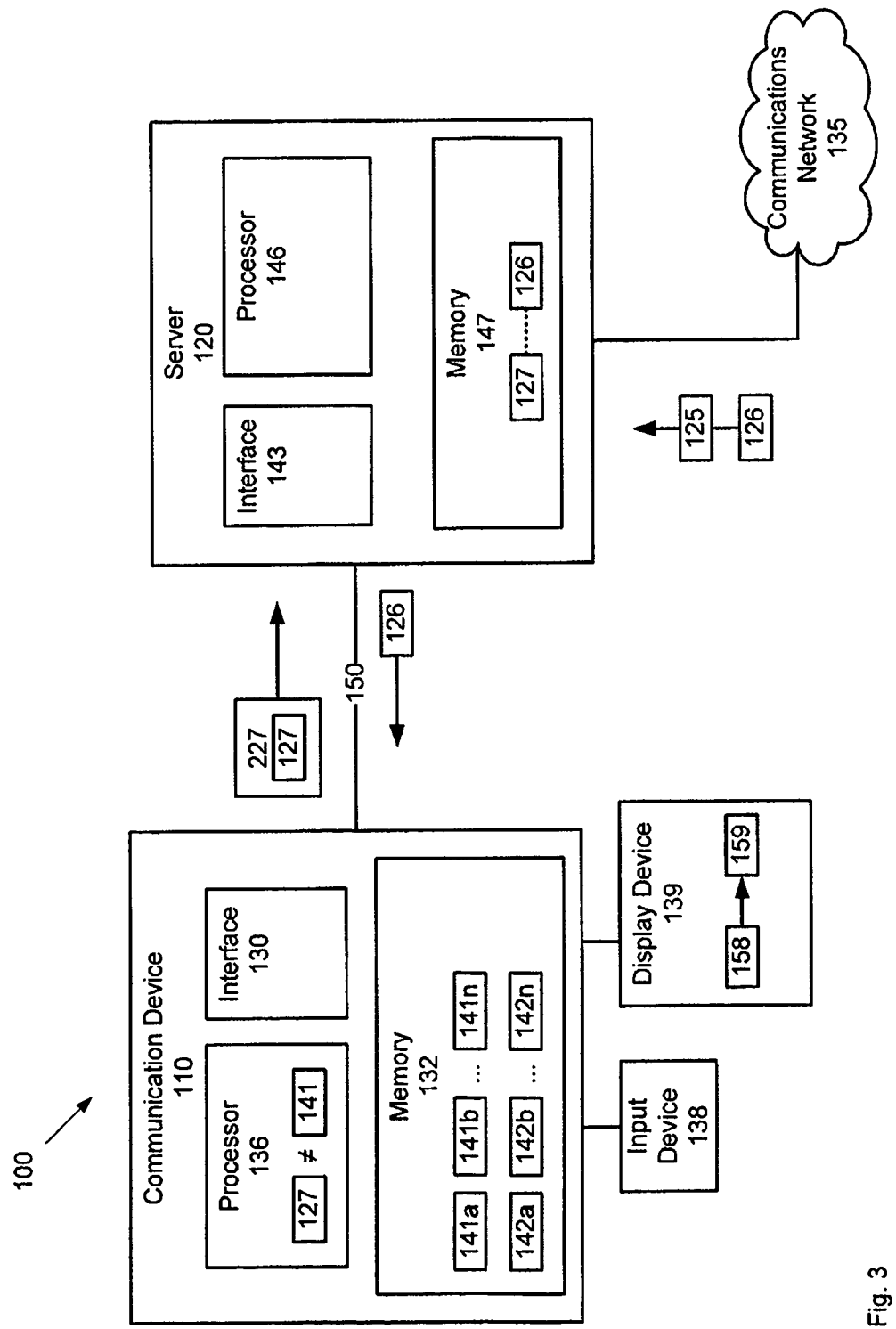
FIG. 3 depicts the system of FIG. 1 when a match is not found between an identifier of an attachment and identifiers of attachments stored at the communication device, according to non-limiting embodiments.

At step 220, at communication device 110, identifier 127 is compared with identifiers 141 of attachments 142 already stored in memory 132, for example by processing identifiers 141 in conjunction with identifier 127. If no match is found at step 230, then at step 240 communication device 110 can request attachment 126 from server 120. In some embodiments, as depicted in FIG. 3, communication device 110 transmits a request 227 comprising identifier 127 to server 120, and attachment 126 can be transmitted from server 120 to communication device 110. Attachment 126 can then be provided at display device 139 by controlling circuitry 158, for example within representation 159.

However, in some embodiments, at step 230, a match is found between identifier 127 and an identifier 141. In non-limiting exemplary embodiments, it is understood that attachment 142a is associated with identifier 141a, and that furthermore, attachment 142a is a copy of attachment 126. For example attachment 142a can have been received and stored by communication device 110 via an earlier message. Hence, message 125 can comprise a reminder that attachment 126 (i.e. same as attachment 142a) is to be processed by processor 136 and/or provided at display device 139 and/or trigger a suitable response.

Figure 4:
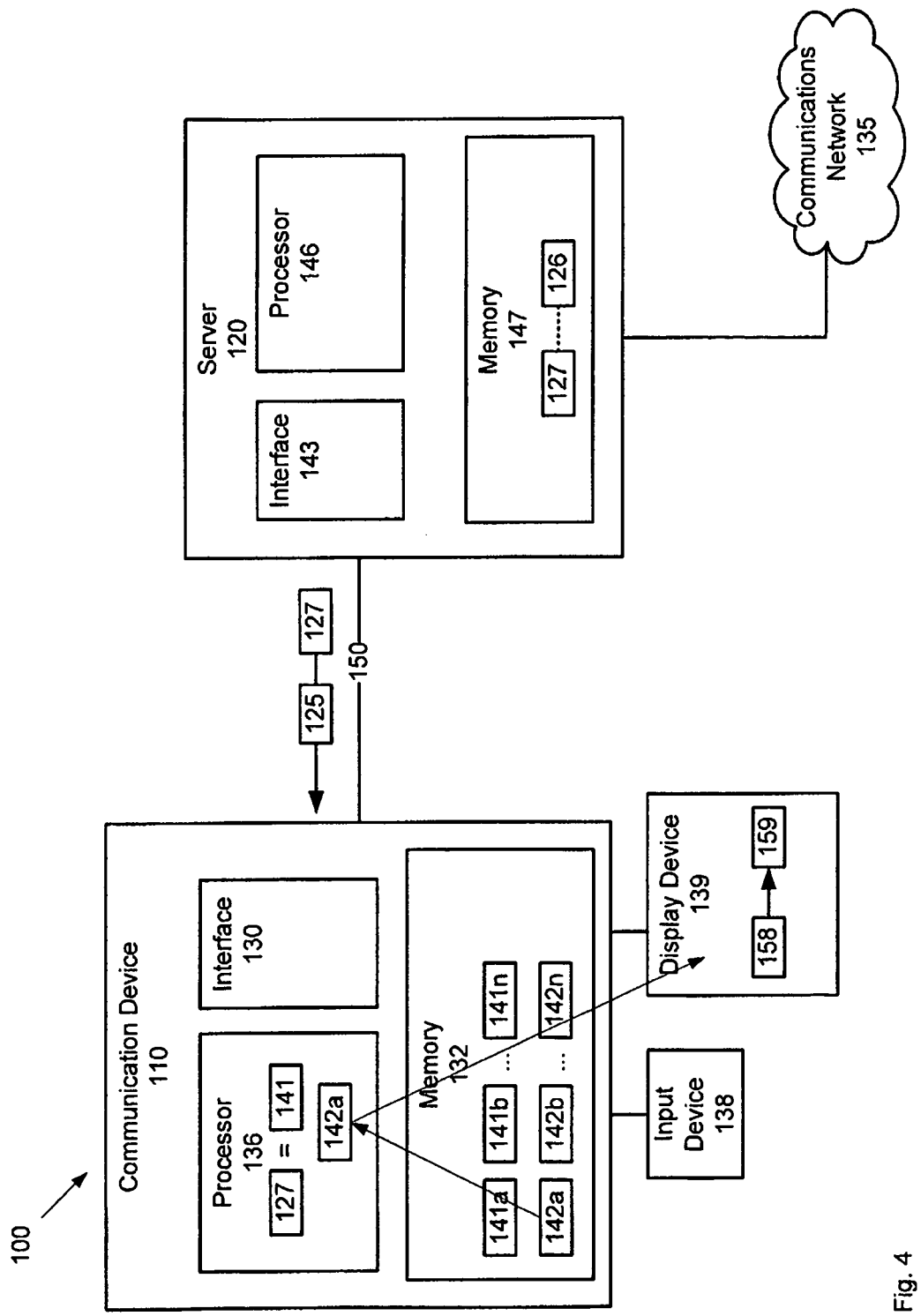
FIG. 4 depicts the system of FIG. 1 when a match is found between an identifier of an attachment and identifiers of attachments stored at the communication device, according to non-limiting embodiments.

In any event, as depicted in FIG. 4, if a match is found at step 230, at step 250 processor 136 causes communication device 110 to retrieve a copy of attachment 126 (i.e. attachment 142a) from memory 132 such that, at step 260, the copy, i.e. attachment 142a, is provided at display device 139 by controlling circuitry 158. In these embodiments, representation 159 comprises a representation of attachment 142a (i.e. a copy of attachment 126). Hence, a redundant transmission of attachment 126 is obviated, as a copy of attachment 126, i.e. attachment 142a, is already stored at communication device 110, hence reducing bandwidth utilized in processing message 125 at communication device 110.

In some embodiments, steps 201 and 210-260 are implemented upon receipt of message 125 at communication device 110. In other embodiments, steps 201 and steps 210-260 occur only when message 125 is processed within a message application (not depicted) at communication device 110, and an attempt to process (e.g. access and/or open) the respective attachment (i.e. attachment 126) occurs: as indicator 127 has been transmitted in lieu of attachment 126, indicator 127 is then used to determine if a copy of attachment 126 is already stored in memory 132, in order to save bandwidth in redundantly transmitting attachment 126. Processing and/or accessing and/or opening the respective attachment can be understood to mean launching an application for viewing the respective attachment and providing the respective attachment for viewing within the application (e.g. opening a text document using a word processor application). Launching such an application can occur when input data is received indicative that an icon representing the respective attachment has been selected.

Attention is now directed to FIG. 5, which depicts system 600, system 600 similar to system 100, with like elements having like numbers, however preceded by a "6" rather than a "1". For example, communication device 610 is similar to communication device 110. In these embodiments, however, indicators 641', similar to indicators 141, are stored at server 620 and indicators 641 are stored at communication device 610. In general each indicator 641 corresponds to an indicator 641' in a one-to-one relationship.

In general method 200 can be implemented in system 600 and in general represents embodiment 3, described above. It is understood that as attachments 642 are transmitted to communication device 610 from server 620, a respective identifier 641', similar to a respective identifier 641, is stored in memory 647 (in some embodiments in a list), such that a record of identifiers 641' of attachments 642 already stored in memory 632 of communication device 610 is stored at server 620. In some embodiments, if an attachment 642 at communication device 610 is deleted from memory 632, communication device 610 transmits an indication of the deletion to server 620 such that the record of identifiers 641' at server 620 can be updated (i.e. a respective identifier 641' is deleted from memory 647).

In any event, in these embodiments, alternative step 201 of method 200 is not implemented, and steps 210 to 250 are implemented in server 620.

At step 220, processor 646 compares identifier 627 with identifiers 641' of attachments 642 already stored in memory 632 of communication device 610. Hence, in these embodiments, identifiers 641' stored in memory 647 are processed in performing the comparison, rather than identifiers 641 stored in memory 632.

If a match is not found at step 230, then at step 240 the message 625 is transmitted to communication device 610 with attachment 626, as depicted in FIG. 6. Otherwise, if a match is found at step 230, as depicted in FIG. 5, then at step 250, server 620 causes communication device 610 to retrieve a copy of attachment 626 from memory 632 by transmitting identifier 627 and message 625, to communication device 610, to trigger retrieval of a copy of attachment 626 from memory 632 based on identifier 627. In other words, communication device 610 receives identifier 627 and it is understood that identifier 627 is indicative of a respective attachment 642, for example attachment 642a, already stored in memory 632: processor 636 performs a comparison of identifier 627 and identifiers 641 to identify the respective attachment 642. The respective attachment 642, for example attachment 642*a*, is then retrieved from memory 632 and display device 639 is controlled to provide representation 659 of attachment 642*a*. In some embodiments, retrieval of attachment 642*a* and controlling display device 639 to provide representation 659 of attachment 642*a* occurs only when message 625 is processed within a message application (not depicted), and an attempt to open the respective attachment (i.e. attachment 626) occurs.

In any event, by comparing an identifier of an attachment to a message, for transmission from a server to a communication device, with identifiers of attachments already stored in a memory at the communication device, rather than immediately transmitting the attachment, bandwidth can be conserved if a match is found between the identifier and identifiers of attachments already stored in the memory as the communication device can then retrieve a copy of the attachment from the memory rather than redundantly receiving it from the server.

Those skilled in the art will appreciate that in some embodiments, the functionality of computing devices 110, 610 and servers 120, 620 can be implemented using pre-programmed hardware or firmware elements (e.g., application specific integrated circuits (ASICs), electrically erasable programmable read-only memories (EEPROMs), etc.), or other related components. In other embodiments, the functionality of computing devices 110, 610 and servers 120, 620 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for reducing download of redundant attachments to a communication device from a server, the method comprising:
   maintaining a list of identifiers of attachments already stored in a memory at said communication device at one or more of said communication device and said server;
   comparing an identifier of an attachment to a message, for transmission from said server to said communication device, with said identifiers of attachments already stored in said memory at said communication device; and,
   causing said communication device to retrieve a copy of said attachment from said memory if a match is found between said identifier and said identifiers of attachments already stored in said memory; and, if no match is found between said identifier and said identifiers of attachments already stored in said memory, said attachment is caused to be transmitted to said communication device from said server.

2. The method of claim 1, wherein said method is implemented in said communication device, said method further comprising receiving said identifier at said communication device, said identifier received in lieu of said attachment.

3. The method of claim 2, further comprising requesting said identifier from said server.

4. The method of claim 2, wherein said causing said communication device to retrieve a copy of said attachment from said memory occurs via a processor of said communication device.

5. The method of claim 2, further comprising requesting said attachment from said server if no match is found between said identifier and said identifiers of attachments already stored in said memory.

6. The method of claim 1, wherein said method is implemented in said server, and said causing said communication device to retrieve said copy of said attachment comprises transmitting said identifier and said message to said communication device to trigger retrieval of said copy of said attachment from said memory based on said identifier.

7. The method of claim 1, wherein each of said identifier and said identifiers of attachments already stored in said memory at said communication device comprise a hash of each respective attachment and said attachments already stored in said memory.

8. The method of claim 1, further comprising generating said identifier.

9. A server for reducing download of redundant attachments to a communication device, the server comprising:
   a communication interface for communicating with said communication device;
   a processor in communication with said communication interface, said processor enabled to:
      maintain a list of identifiers of attachments already stored in a memory at said communication device;
      compare an identifier of an attachment to a message for transmission from said server to said communication device with said identifiers of attachments already stored in a memory at said communication device; and,
      cause said communication device to retrieve a copy of said attachment from said memory if a match is found between said identifier and said identifiers of attachments already stored in said memory; and, if no match is found between said identifier and said identifiers of attachments already stored in said memory, said attachment is caused to be transmitted to said communication device from said server.

10. The server of claim 9, further comprising a server memory for maintaining said list of said identifiers of attachments already stored in said memory at said communication device.

11. The server of claim 9, wherein said processor is further enabled to cause said communication device to retrieve said copy of said attachment by transmitting said identifier and said message to said communication device to trigger retrieval of said copy of said attachment from said memory based on said identifier.

12. The server of claim 9, wherein each of said identifier and said identifiers of attachments already stored in a memory at said communication device comprise a hash of each respective said attachment and said attachments already stored in said memory.

13. The server of claim 9, wherein said processor is further enabled to generate said identifier.

14. A communication device for reducing download of redundant attachments to said communication device from a server, the communication device comprising:
   a communication interface for communicating with said server;
   a memory for storing attachments and identifiers of said attachments; and
   a processor in communication with said communication interface and said memory, said processor enabled to:
      maintain a list of said identifiers of attachments already stored in said memory;
      receive, from said server, via said communication interface, an identifier of an attachment to a message for transmission from said server to said communication device;
      compare said identifier with said identifiers of said attachments stored in said memory; and,
      retrieve a copy of said attachment from said memory if a match is found between said identifier and said identifiers of attachments stored in said memory; and, if no match is found between said identifier and said identifiers of attachments stored in said memory, said processor is enabled to retrieve said attachment from said server.

15. The communication device of claim 14, wherein said processor is further enabled to receive, from said server, said identifier in lieu of said attachment.

16. The communication device of claim 14, wherein said processor is further enabled to request said identifier from said server.

17. The communication device of claim 14, wherein each of said identifier and said identifiers of attachments stored in said memory comprise a hash of each said attachment and said attachments stored in said memory.

18. A system for reducing download of redundant attachments comprising:
   a communication device and a server, in communication via a communication network;
   said server enabled to:
      generate an identifier of an attachment to a message for transmission from said server to said communication device; and
      transmit said identifier to said communication device with said message, in lieu of said attachment; and
   said communication device enabled to:
      receive said identifier with said message;
      compare said identifier with identifiers of attachments already stored in a memory at said communication device;
      retrieve a copy of said attachment from said memory if a match is found between said identifier and said identifiers of attachments already stored in said memory; and
      request said attachment from said server if a match is not found between said identifier and said identifiers of attachments already stored in said memory,
      wherein at least one of said server and said communication device is further enabled to maintain said list of identifiers of attachments already stored in a memory at said communication device.

19. A non-transitory computer readable storage medium storing programming instructions executable on a processor of a computing device, said programming instructions causing said computing device to:
   maintain a list of identifiers of attachments already stored in a memory at said communication device;
   compare an identifier of an attachment to a message, for transmission from a server to a communication device, with said identifiers of attachments already stored in a memory at said communication device; and,
   cause said communication device to retrieve a copy of said attachment from said memory if a match is found between said identifier and said identifiers of attachments already stored in said memory; and, if no match is found between said identifier and said identifiers of attachments already stored in said memory, said attachment is caused to be transmitted to said communication device from said server.

* * * * *